United States Patent [19]

Linder

[11] 3,892,859

[45] July 1, 1975

[54] 1-(M-TRIFLUOROMETHYLPHENYL)-5-HALOPYRIDAZONES-(6) AS SLEEP INDUCERS

[75] Inventor: Jerome Linder, Westfield, N.J.

[73] Assignee: Sandoz-Wander, Inc., E. Hanover, N.J.

[22] Filed: June 6, 1974

[21] Appl. No.: 476,921

Related U.S. Application Data

[62] Division of Ser. No. 306,440, Nov. 14, 1972, abandoned.

[52] U.S. Cl. ................................................ 424/250
[51] Int. Cl. ........................................... H61k 27/00
[58] Field of Search ..................................... 424/250

[56] References Cited
UNITED STATES PATENTS 3,709,885    1/1973    Ebner et al. .................... 260/250 A Primary Examiner—Jerome D. Goldberg
Attorney, Agent, or Firm—Gerald D. Sharkin; Robert S. Honor; Thomas O. McGovern

[57] ABSTRACT

Certain 5-halopyridazones-(6), e.g., 1-(m-trifluoromethylphenyl)-4-(N-methyl-N-hydroxy)amino-5-chloropyridazone-(6), are useful as sleep inducing agents.

12 Claims, No Drawings

1-(M-TRIFLUOROMETHYLPHENYL)-5-HALOPYRIDAZONES-(6) AS SLEEP INDUCERS

This is a division of application Ser. No. 306,440, filed Nov. 14, 1972, now abandoned.

This invention relates to the pharmaceutical activity of 5-halopyridazone-(6) derivatives. More particularly, this invention concerns the use of 4-substituted hydroxylamino-5-halopyridazones-(6) as sleep inducing agents in mammals. The invention also relates to pharmaceutical compositions containing these compounds as an active ingredient thereof.

The active agents with which this invention is concerned may be represented by the following structural formula:

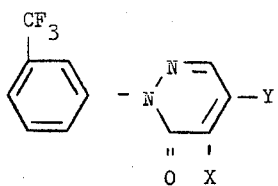

wherein
Y is —NHOH,—NHOR$_2$ or

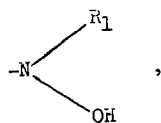

$R_1$ and $R_2$ are each alkyl of 1 to 4 carbon atoms, and X is halogen having an atomic weight of about 35 to 80.

The preferred compounds of formula (I) are those in which X is chlorine and Y is

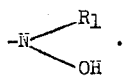

The sleep inducing preferred compound is 1-(m-trifluoromethylphenyl)-4-(N-methyl-N-methoxy)amino-5-chloropyridazone-(6).

The compounds of formula (I) may be produced by reacting a compound of the formula

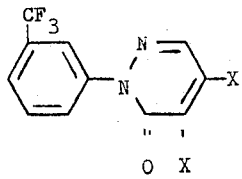

with a compound of formula (III)

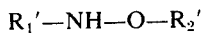

(III)

wherein
$R_1'$ and $R_2'$ are each hydrogen or alkyl of 1 to 4 carbon atoms; provided that when one of $R_1'$ or $R_2'$ is alkyl, the other is hydrogen.

The compounds of formula (I) are prepared by treating a compound of formula (II) with a compound of formula (III). Although the use of a solvent is not essential, the reaction is preferably carried out in the presence of an inert solvent, e.g., water, lower alkanols, such as methanol, ethanol, and the like, aromatic hydrocarbons, such as benzene, toluene or xylene, ethers, such as diethyl ether, dioxane, etc., acetonitrile, dimethylformamide or mixtures of the aforementioned solvents or, if desired, in the presence of an excess of the hydroxylamine of formula (III). It is preferred that the reaction be carried out in the presence of excess base, e.g., reagent (III), triethylamine or sodium or potassium carbonate. The particular temperature at which the reaction is run is also not critical, but the reaction is preferably carried out at temperatures between about 20° to about 150°C, in particular, between about 20° to 65°C. For optimum results, the reaction should be run in excess of one hour, although the reaction time is not critical. The product is isolated by conventional techniques, e.g., by crystallization.

Many of the compounds of formulas (II) and (III) are known and may be prepared by techniques disclosed in the literature. The compounds of formulas (II) and (III) not specifically disclosed may be prepared by known techniques from known starting materials.

The compounds of formula (I) are useful as sleep inducing agents as indicated in cebus monkey using chronically implanted electrodes. Brain readings are obtained via a ten or sixteen channel electroencephalograph.

For the recording sessions, the monkeys are restrained by neck and waist plates in chairs in full side observation cages at the same time every night for thirteen and half hours Monday through Thursday. Gross behavior is monitored via closed circuit television and video tape recordings.

The compounds are administered p.o. immediately on placing the monkey in the observation cages with at least seven days intervening between drug injections. Physiological saline is administered via a similar route and at the same times on all control runs.

Control data are collected at least three days per week and accumulated to give control data for fifteen sessions per monkey. Data from each session are statistically compared via computer analysis to the previous 5–15 control sessions for the particular animal, with particular emphasis given to the following phases of the sleep-wakefulness cycle: resting awake, light sleep, deep sleep, paradoxical (REM) sleep, "pseudo-" paradoxical sleep, latency to onset of deep sleep, and latency to onset of first epoch of paradoxical sleep.

For such usage the compounds of formula (I) may be administered orally or parenterally as such or admixed with conventional pharmaceutical carriers. They may be administered orally in such forms as tablets, dispersible powders, granules, capsules, oral liquid suspensions and parenterally as a suspension, e.g., a sterile injectable aqueous suspension. The compositions for oral use may contain one or more conventional adjuvants, such as sweetening agents, flavoring agents, coloring agents and preserving agents, in order to provide an elegant and palatable preparation. Tablets may contain the active ingredient in admixture with conventional pharmaceutically acceptable excipients, e.g., inert diluents, such as calcium carbonate, sodium carbonate, lactose, and talc, granulating and disintegrating agents, g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastrointestinal tract and thereby provide a sustained action over a longer period. Similarly, the suspensions may contain the active ingredient in admixture with any of the conventional excipients utilized for the preparation of such compositions, e.g., suspending agents (methylcellulose, tragacanth and sodium alginate), wetting agents (lecithin, polyoxyethylene sorbitan monoleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art. These pharmaceutical preparations may contain up to about 90 percent of the active ingredient in combination with the carrier or adjuvant.

The sleep inducing effective dosage of the compounds of formula (I) will vary depending on the particular compound employed. However, in general, satisfactory results are obtained when the compounds are administered at a daily dosage of from about 1 milligram to about 200 milligrams per kilogram of animal body weight, typically given in a single dose at bedtime. For most large mammals, the total daily dosage is from about 75 to about 1,500 milligrams. The preferred pharmaceutical compositions from the standpoint of preparation and ease of administration are solid compositions, particularly hard-filled capsules and tablets containing about 200 milligrams of active ingredient.

EXAMPLE 1

1-(m-trifluoromethylphenyl)-4-(N-methyl-N-hydroxy)amino-5-chloropyridazone-(6)

To a solution consisting of 15.5 grams of 1-(m-trifluoromethylphenyl)-4,5-dichloropyridazone-(6) in 100 grams of isopropanol is added 6.7 grams N-methyl-hydroxylamine. The reaction mixture is stirred overnight at room temperature and then concentrated by vacuum. The resulting oil is dissolved in chloroform and washed with water. The chloroform layer is concentrated by vacuum and the resulting product is crystallized from benzene to yield 1-(m-trifluoromethylphenyl)-4-(N-methyl-N-hydroxy)amino-5-chloropyridazone-(6) (m.p. 114°–115°C).

The 1-(m-trifluoromethylphenyl)-4-(N-methyl-N-hydroxy)amino-5-chloropyridazone-(6) of this example is an effective sleep inducer when it is orally administered at a dose of 200 milligrams just before bedtime.

Following the above procedure, but using an equivalent amount of hydroxylamine or methoxyamine in place of the N-methylhydroxylamine used therein, there is obtained 1-(m-trifluoromethylphenyl)-4-hydroxylamino-5-chloro-pyridazone-(6) or 1-(m-trifluoromethylphenyl)-4-methoxyamino-5-chloro-pyridazone-(6) respectively.

EXAMPLES 2 AND 3

Tablets and capsules containing the ingredients indicated below may be prepared by conventional techniques and are useful as sleep inducers at a dose of one or two tablets just before bedtime.

| Ingredients | Weight (mg) tablet | capsule |
|---|---|---|
| 1-(m-trifluoromethylphenyl)4-(N-methyl-N-hydroxy)amino-5-chloropyridazone-(6) | 200 | 200 |
| tragacanth | 10 | — |
| lactose | 247.5 | 300 |
| corn starch | 25 | — |
| talcum | 15 | — |
| magnesium stearate | 2.5 | — |
| | 500 mg. | 500 mg. |

Similar tablets and capsules are prepared using 1-(m-trifluoromethylphenyl)-4-hydroxylamino-5-chloropyridazone-(6) or 1-(m-trifluoromethylphenyl)-4-methoxyamino-5-chloropyridazone-(6) in place of the 1-(m-trifluoromethylphenyl)-4-(N-methyl-N-hydroxy)-amino-5-chloropyridazone-(6).

EXAMPLES 4 AND 5

Sterile Suspension for Injection and Oral Liquid Suspension

The following pharmaceutical compositions are formulated with the indicated amount of active agent using conventional techniques. The injectable suspension and the oral liquid suspension represent formulations useful as unit doses and may be administered to induce sleep just before bedtime.

| Ingredients | Weight (mg) sterile injectable suspension | oral liquid suspension |
|---|---|---|
| 1-(m-trifluoromethylphenyl)-4-(N-methyl-N-hydroxy)amino-5-chloro pyridazone-(6) | 200 | 200 |
| sodium carboxy methyl cellulose U.S.P. | 1.25 | 12.5 |
| methyl cellulose | 0.4 | — |
| polyvinylpyrrolidone | 5 | — |
| Lecithin | 3 | — |
| benzyl alcohol | 0.01 | — |
| magnesium aluminum silicate | — | 47.5 |
| flavor | — | q.s. |
| color | — | q.s. |
| methyl paraben, USP | — | 4.5 |
| propyl paraben, USP | — | 1.0 |
| polysorbate 80 (e.g. Tween 80), USP | — | 5 |
| sorbitol solution, 70% USP | — | 2500 |
| buffer agent to adjust pH for desired stability | q.s. | q.s. |
| water | for injection q.s. to 1 ml. | q.s. to 5 ml. |

Following the above procedures, similar sterile injectable suspensions or oral liquid suspensions may be prepared using 1-(m-trifluoromethylphenyl)-4-hydroxylamino-5-chloropyridazone-(6) or 1-(m-trifluoromethylphenyl)-4-methoxyamino-5-chloropyridazone-(6) in place of the 1-(m-trifluoromethylphenyl)-4-(N-methyl-N-hydroxy)amino-5-chloropyridazone-(6) used therein.

What is claimed is:

1. A method for inducing sleep which comprises orally or parenterally administering to a mammal in need of said treatment a sleep inducing effective amount of a compound of the formula:

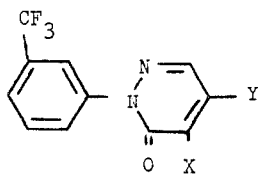

where
Y is —NHOH, —NHOR$_2$ or

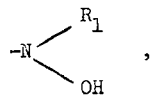

R$_1$ and R$_2$ are each alkyl of 1 to 4 carbon atoms and X is halo having an atomic weight of about 35 to 80.

2. The method of claim 1 wherein the compound is administered orally or parenterally at a daily dosage of from about 75 milligrams to about 1500 milligrams.

3. The method of claim 1 wherein the compound is orally administered in a unit dosage form comprising said compound to the extent of about 200 milligrams per unit dosage.

4. The method of claim 1 in which X is chlorine and Y is

where R$_1$ is alkyl of 1 to 4 carbon atoms.

5. The method of claim 1 in which the compound is 1-(m-trifluoromethylphenyl)-4-(N-methyl-N-hydroxy)amino-5-chloropyridazone-(6).

6. A pharmaceutical composition in solid or sterile liquid form for inducing sleep in mammals comprising as an active ingredient thereof a compound of the formula

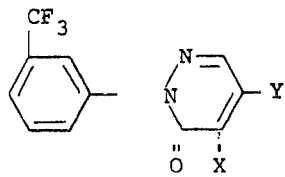

where X and Y are as defined in claim 1 and a pharmaceutically acceptable carrier therefor, said compound being present in said composition in an amount sufficient to provide a daily dosage of from about 75 to about 1,500 milligrams of said compound.

7. The pharmaceutical composition of claim 6 wherein said active ingredient is present in said composition to the extent of about 200 milligrams per unit dosage.

8. The composition according to claim 6 in which X is chlorine and Y is

where R$_1$ is alkyl having 1 to 4 carbon atoms.

9. The composition according to claim 6 in which the active ingredient is 1-(m-trifluoromethylphenyl)-4-(N-methyl-N-hydroxy)amino-5-chloropyridazone-(6).

10. A pharmaceutical composition for inducing sleep in mammals in the form of a tablet comprising as the active ingredient thereof a compound of the formula

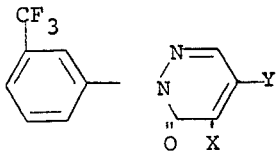

where X and Y are as defined in claim 1 and a pharmaceutically acceptable acid carrier therefor, said compound being present in said tablet to the extent of about 200 milligrams per unit dosage.

11. The tablet of claim 10 in which X is chlorine and Y is

where R$_1$ is alkyl having 1 to 4 carbon atoms.

12. The tablet of claim 10, in which the active ingredient is 1-(m-trifluoromethylphenyl)-4-(N-methyl-N-hydroxy)amino-5-chloropyridazone-(6).

* * * * *